US008691917B2

(12) United States Patent
Fan

(10) Patent No.: US 8,691,917 B2
(45) Date of Patent: Apr. 8, 2014

(54) IONOMERS MODIFIED WITH IMIDIZED ACRYLIC RESINS

(75) Inventor: Xiyun Serene Fan, Newark, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 508 days.

(21) Appl. No.: 12/900,770

(22) Filed: Oct. 8, 2010

(65) Prior Publication Data
US 2012/0088882 A1 Apr. 12, 2012

(51) Int. Cl.
C08L 33/02 (2006.01)
C08L 23/08 (2006.01)
C08F 8/32 (2006.01)

(52) U.S. Cl.
USPC ........... 525/221; 525/181; 525/192; 525/217; 525/240; 525/329.9; 525/330.5

(58) Field of Classification Search
USPC ............... 525/70, 73, 80, 181, 192, 217, 221, 525/222, 240, 329.9, 330.5, 196
See application file for complete search history.

(56) References Cited

U.S. PATENT DOCUMENTS

| 2,146,209 | A |   | 2/1939 | Witt |
|---|---|---|---|---|
| 3,264,272 | A |   | 8/1966 | Rees |
| 3,284,425 | A |   | 11/1966 | Dunter |
| 4,169,924 | A |   | 10/1979 | Barabas |
| 4,217,424 | A |   | 8/1980 | Weese |
| 4,246,374 | A |   | 1/1981 | Kopchik |
| 4,255,322 | A |   | 3/1981 | Kopchik |
| 4,351,931 | A |   | 9/1982 | Amitage |
| 4,415,706 | A |   | 11/1983 | Staas |
| 4,595,727 | A |   | 6/1986 | Doak |
| 4,727,117 | A |   | 2/1988 | Hallden-Abberton |
| 4,874,817 | A |   | 10/1989 | Insip |
| 5,047,475 | A | * | 9/1991 | Ogawa et al. .................. 525/73 |
| 5,318,813 | A |   | 6/1994 | Flexman |
| 5,362,809 | A |   | 11/1994 | Hallden-Abberton |
| 5,502,111 | A |   | 3/1996 | Huynh-Ba |
| 6,919,395 | B2 |   | 7/2005 | Rajagoplan |
| 7,208,546 | B2 |   | 4/2007 | Rajagoplan |
| 7,261,647 | B2 |   | 8/2007 | Sullivan |
| 7,314,896 | B2 |   | 1/2008 | Rajagoplan |

FOREIGN PATENT DOCUMENTS

EP 2090617 A1 8/2009

* cited by examiner

Primary Examiner — Irina S Zemel
Assistant Examiner — Jeffrey Lenihan

(57) ABSTRACT

Compositions comprising ionomers and imidized acrylic resins are disclosed. Articles prepared from the compositions exhibit improved heat resistance properties such as increased Vicat temperature, increased stiffness/modulus at room temperature and elevated temperatures below the ionomer's melting point, and increased upper use temperature at a given stiffness over those of ionomers alone.

20 Claims, No Drawings

IONOMERS MODIFIED WITH IMIDIZED ACRYLIC RESINS

BACKGROUND OF THE INVENTION

Thermoplastic ionomers of copolymers of α-olefins, particularly ethylene, and $C_{3-8}$ α,β ethylenically unsaturated carboxylic acids such as acrylic acid and methacrylic acid offer excellent properties in transparency, chemical resistance, toughness, scratch resistance, gloss, as well as a wide range of processability. They are widely used in packaging and industrial applications. U.S. Pat. No. 3,264,272 teaches methods for making such ionomers. The acid copolymers on which the ionomers are based may be prepared as described in U.S. Pat. No. 4,351,931.

However, stiffness and rigidity of these ionomers drop when the end use temperature is elevated above ambient, especially above 50° C. This property can be quantified as the heat deflection temperature. Low heat deflection temperatures have restricted the use of ionomers in many applications where higher heat deflection temperature and higher stiffness are required.

Ionomers have been modified with nanoclays to increase their stiffness. See U.S. Pat. Nos. 6,919,395, 7,208,546, 7,261,647, and 7,314,896. High complexity is involved in dispersing nanoclay with ionomers in order to achieve high efficacy.

U.S. Pat. Nos. 4,255,322, 4,595,727, 5,362,809 and 5,502,111 disclose blends of PVC with polyglutarimides having improved heat deflection temperatures. The polyglutarimides themselves, also known as imidized acrylic polymers or imides of polyacrylic acids, have been described in U.S. Pat. Nos. 2,146,209, 3,284,425, 4,169,924, and 4,246,374. It is also known to combine imidized acrylic polymers with other materials, such as impact modifiers, pigments, fibers, stabilizers, lubricants etc., as described in U.S. Pat. Nos. 4,246,374 and 4,217,424.

Imidized acrylic resins have also been blended with polyamides (nylons) to improve the melt flow, melt strength, tensile strength, and modulus of polyamides. Compatible polymer blends of polyamides and imidized acrylic resins possess improved impact resistance and ductility compared with neat imidized acrylic resins. The addition of high service temperature imidized acrylic resins to a lower service temperature nylon results in improved service temperature for the nylon. Compatible polymer blends of imidized acrylic resins, nylons, and conventional impact modifiers exhibit an improved response to impact modification than does the imide modified with an equal amount of the conventional impact modifier (see U.S. Pat. Nos. 4,415,706 and 4,874,817).

Imidized acrylic resins with low acid levels have been blended with other thermoplastic polymers to provide improved properties such as better melt viscosity, greater compatibility and/or miscibility, greater weather ability, greater impact resistance, better ductility and better solvent resistance (see U.S. Pat. No. 4,727,117).

Imidized acrylic resins have also been blended with compositions of polyoxymethylene (POM) and thermoplastic polyurethane to provide improvement in mold shrinkage while still maintaining a useful balance of the properties, such as stiffness, elongation, and toughness, that are inherent in the POM/polyurethane composition (see U.S. Pat. No. 5,318,813).

It is desirable to develop ionomer compositions with improved heat resistance properties such as increased Vicat temperature, increased stiffness/modulus at room temperature and at elevated temperatures below the ionomer's melting point, and increased upper use temperature at a given stiffness. It is also desirable to develop compositions with these properties that are easy to prepare and process. Preferably, improving the heat resistance of the ionomer would not come at the expense of deterioration in the other attractive properties of ionomers like toughness (measured by notched izod), abrasion resistance or ability to form strong bonds between adjacent layers of ionomer by the application of heat from a sealing bar (heat seal initiation). Incorporating mineral fillers to improve the heat deflection temperature typically comes at the expense of toughness.

SUMMARY OF THE INVENTION

The invention provides a thermoplastic composition comprising, consisting essentially of, or prepared from, a mixture of, based on the weight of the mixture, 70 to 99 weight % of an ionomer composition and 1 to 30 weight % of an imidized acrylic resin wherein the ionomer composition comprises, consists essentially of, or is produced from, at least one ethylene acid copolymer;

the ethylene acid copolymer comprises or consists essentially of copolymerized comonomers of ethylene, about 3 to about 30 weight % of copolymerized comonomers of at least one $C_3$ to $C_8$ α,β-ethylenically unsaturated carboxylic acid, and 0 to about 30 weight % of copolymerized comonomers of at least one $C_3$ to $C_8$ α,β ethylenically unsaturated carboxylic acid ester, based on the total weight of the ethylene acid copolymer, and the remainder is ethylene;

at least a portion of the acid moieties in the acid copolymer are nominally neutralized with a salt containing alkali metal cations, alkaline earth meta cations, transition metal cations, or combinations of two or more thereof; and the imidized acrylic resin has a degree of imidization from 20% to 100%.

This invention also provides a method that can be used to produce an article comprising an ionomer composition, the method comprising (1) melt blending a ionomer composition and an imidized acrylic resin to produce a molten composition; (2) forming the molten composition into a desired shape; and (3) cooling the molten composition to provide a shaped article wherein the molten composition comprises, based on the weight of the molten composition, 70 to 99 weight % of the ionomer composition and 1 to 30 weight % of the imidized acrylic resin;

the ionomer composition and the imidized acrylic resin can be as described above;

the shaped article has a Vicat temperature determined according to ASTM D1525 that exceeds that of a comparison standard article; and the shaped article and the comparison standard article have
    the same shape and structure with the exception that the
    comparison standard article is produced from the ionomer composition that does not comprise the imidized acrylic resin.

DETAILED DESCRIPTION OF THE INVENTION

All publications, patent applications, patents, and other references mentioned herein are incorporated by reference in their entirety.

The term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such.

In addition, the ranges set forth herein include their endpoints unless expressly stated otherwise. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed. The scope of the invention is not limited to the specific values recited when defining a range.

When materials, methods, or machinery are described herein with the term "known to those of skill in the art", "conventional" or a synonymous word or phrase, the term signifies that materials, methods, and machinery that are conventional at the time of filing the present application are encompassed by this description. Also encompassed are materials, methods, and machinery that are not presently conventional, but that may have become recognized in the art as suitable for a similar purpose.

Unless stated otherwise, all percentages, parts, ratios, and like amounts, are defined by weight.

As used herein, the term "copolymer" refers to polymers comprising copolymerized units resulting from copolymerization of two or more comonomers. In this connection, a copolymer may be described herein with reference to its constituent comonomers or to the amounts of its constituent comonomers, for example "a copolymer comprising ethylene and 18 weight % of acrylic acid", or a similar description. Such a description may be considered informal in that it does not refer to the comonomers as copolymerized units; in that it does not include a conventional nomenclature for the copolymer, for example International Union of Pure and Applied Chemistry (IUPAC) nomenclature; in that it does not use product-by-process terminology; or for another reason. As used herein, however, a description of a copolymer with reference to its constituent comonomers or to the amounts of its constituent comonomers means that the copolymer contains copolymerized units (in the specified amounts when specified) of the specified comonomers. It follows as a corollary that a copolymer is not the product of a reaction mixture containing given comonomers in given amounts, unless expressly stated in limited circumstances to be such. The term "dipolymer" refers to polymers consisting essentially of two copolymerized monomers and "terpolymer" refers to polymers consisting essentially of three copolymerized monomers.

The composition, when formed into an article, can exhibit a Vicat temperature determined according to ASTM D1525 that exceeds that of a comparison standard article wherein the shaped article and the comparison standard article have the same shape and structure with the exception that the comparison standard article is prepared from an ionomer composition that does not comprise an imidized acrylic resin.

The imidized acrylic resin can be obtained by treating an acrylic polymer with ammonia or a monoalkyl amine wherein the monoalkyl group has from one to five carbon atoms, the degree of imidization is 20% to 100% and the acid level is from 0 to 10 weight % of the imidized acrylic resin.

Preferably, the imidized acrylic resin is obtained by treating polymethyl methacrylate with a monoalkyl amine, more preferably methyl amine. Also preferably the imidized acrylic resin comprises cyclic imide units.

This invention also provides an article comprising the composition described above. The article may have a Vicat temperature determined according to ASTM D1525 that exceeds that of a comparison standard article wherein the shaped article and the comparison standard article have the same shape and structure with the exception that the comparison standard article is prepared from an ionomer composition that does not comprise an imidized acrylic resin.

For the purpose of the present disclosure and claims, the terms "imidized acrylic polymer" or "imidized acrylic resin" is used herein in preference to the synonymous term "polyglutarimide". Imidized acrylic polymers are acrylic polymers that have been treated with ammonia or amines to provide polymers containing cyclic imide groups. The term "acrylic polymer" means a polymer comprising polymerized units of an alkyl acrylate ester and/or an alkyl methacrylate ester, preferably, an alkyl methacrylate ester, optionally copolymerized with other comonomers as described below. Acrylic polymer can be selected from the group consisting of homopolymers and copolymers of alkyl esters of methacrylic or acrylic acid wherein the alkyl group contains from 1 to 8 carbon atoms This invention uses imidized acrylic polymers (IA) as modifiers of ionomers to improve heat resistance properties such as increased Vicat temperature, increased stiffness/modulus at room temperature and elevated temperatures below the ionomer's melting point, and increased upper use temperature at a given stiffness. Since the IA has a much higher glass transition temperature than the ionomer, the blend of IA and the ionomer may not only increase heat resistance of the ionomer but also improve other mechanical properties such as tensile strength, as well as good thermoplastic processability.

The acid copolymers used to make the compositions described herein are preferably direct or random copolymers, that is, copolymers polymerized by adding all monomers simultaneously. This process provides mixtures of comonomers that react with each other to form the polymer chain to provide random copolymers having copolymerized units of all comonomers incorporated into the polymer backbone or chain, so that at least some of atoms from the comonomer(s) form part of the polymer backbone. In contrast, in graft copolymers, the grafted comonomer is attached to non-terminal repeat units of an existing polymer chain in a step subsequent to formation of the polymer chain, often by a free radical reaction.

The ethylene $\alpha,\beta$-unsaturated carboxylic acid copolymers used herein may be copolymers of ethylene and an $\alpha,\beta$-ethylenically unsaturated carboxylic acid having 3 to 8 carbons. For example, the acid copolymer may comprise about 10 to about 20 weight % of copolymerized units of the $\alpha,\beta$-ethylenically unsaturated carboxylic acid, based on the total weight of the copolymer.

Suitable ethylenically unsaturated carboxylic acid comonomers include, but are not limited to, acrylic acid, methacrylic acid, or combinations thereof.

In certain embodiments, the acid copolymers may not comprise comonomers other than the $\alpha$-olefins and the $\alpha,\beta$-ethylenically unsaturated carboxylic acids. As such, the copolymers may be dipolymers of the acid copolymer containing or consisting essentially of about 5 to about 30 weight % of copolymerized monomers of the $\alpha,\beta$-ethylenically unsaturated carboxylic acid (such as 10 to 20 weight % of acrylic acid or methacrylic acid), based on the total weight of the copolymer, the remainder being ethylene.

Alternatively, the acid copolymers may further comprise copolymerized units of other comonomer(s) in addition to copolymerized units of the ethylenically unsaturated carboxylic acid and ethylene, such as derivatives of unsaturated carboxylic acids having 3 to 8 carbons. Preferably, the derivatives are alkyl esters wherein the alkyl group comprises 1 to 8 or preferably 1 to 4 carbon atoms. The additional comonomer may be present in about 3 to 30 weight %, or about 10 to 30 weight % of the ethylene acid copolymer. Specific examples of these esters of unsaturated carboxylic acids include, but are not limited to, alkyl acrylates and alkyl methacrylates such as methyl acrylates, methyl methacrylates, ethyl acrylates, ethyl methacrylates, propyl acrylates, propyl methacrylates, isopropyl acrylates, isopropyl methacrylates, butyl acrylates, butyl methacrylates, isobutyl acrylates, isobutyl methacrylates, tert-butyl acrylates, tert-butyl methacrylates, octyl acrylates, octyl methacrylates, 2-ethylhexyl acrylates, 2-ethylhexyl methacrylates, and combinations of two or more thereof. Butyl acrylate is a notable unsaturated carboxylic acid ester.

Accordingly, the ethylene acid copolymer may be a terpolymer consisting essentially of copolymerized comonomers of ethylene, from about 3 to about 30 weight % of copolymerized comonomers of a $C_3$ to $C_8$ $\alpha,\beta$-ethylenically unsaturated carboxylic acid, and from about 3 to about 30 weight % of copolymerized comonomers of a $C_3$ to $C_8$ $\alpha,\beta$ ethylenically unsaturated carboxylic acid ester. Notably, the terpolymer has from 10 to 20 weight % of copolymerized monomers of acrylic acid or methacrylic acid and from 10 to 30 weight % of copolymerized monomers of alkyl acrylate or alkyl methacrylate.

The ethylene acid copolymers may be produced by any methods known to one skilled in the art such as described in U.S. Pat. Nos. 4,351,931 and 5,028,674.

Ionomers are ionic, partially neutralized derivatives of precursor acid copolymers, such as those acid copolymers disclosed above. Ionomers of unsaturated carboxylic acid copolymers may be produced by neutralizing the acid groups of the precursor acid copolymers with a reactant that is a source of metal ions in an amount such that neutralization of about 10% to about 70%, or about 20% to about 60%, or about 35% to about 55% of the carboxylic acid groups takes place, based on the total carboxylic acid content of the precursor unsaturated carboxylic acid copolymers as calculated or measured for the non-neutralized precursor acid copolymers. Neutralization may often be accomplished by treatment of the precursor acid polymer with a base, such as sodium hydroxide, potassium hydroxide, or zinc oxide.

The metal ions may be monovalent ions, divalent ions, trivalent ions, multivalent ions, or combinations of two or more thereof. Useful monovalent metallic ions include but are not limited to sodium, potassium, and lithium. Useful divalent metallic ions include but are not limited to beryllium, magnesium, calcium, strontium, barium, copper, iron, cobalt, and zinc. Useful trivalent metallic ions include but are not limited to aluminum, scandium, iron, and yttrium. Useful multivalent metallic ions include but are not limited to titanium, zirconium, hafnium, vanadium, tantalum, tungsten, cerium, and iron. When the metallic ion is multivalent, complexing agents such as stearate, oleate, salicylate, and phenolate radicals may be included, as disclosed in U.S. Pat. No. 3,404,134. Preferably, the metal ions are monovalent or divalent metal ions, such sodium, lithium, potassium, magnesium, or zinc ions, or combinations of two or more thereof. Notably, the metal ions are sodium, zinc, or combinations thereof, for example, the metal ion is zinc.

Ionomers useful herein include those available from E. I. du Pont de Nemours and Company, Wilmington Del. under the tradename SURLYN®.

Imidized acrylic polymers are known in the art (see e.g., U.S. Pat. Nos. 3,284,425, 4,246,374, 4,518,717, 4,727,117, and 5,110,877). Imidized acrylic polymers may be prepared by reacting ammonia or a primary amine with an acrylate or methacrylate ester homo- or co-polymer such as polymethyl methacrylate. This reaction provides cyclic imide groups resulting from the condensation of the amine with two adjacent ester groups on the acrylic polymer. The molar amount of the ester groups reacted with the amine to form the cyclic imide moiety is referred to as the degree of imidization (degree of imidization is also described in terms of weight % of the cyclic imide group in the resulting copolymer).

The primary amine preferably employed in the imidization step is methylamine, but higher aliphatic amines can also be employed. Other amines include, for example, ethylamine, isopropylamine, and butylamine. Other polymethacrylates or polyacrylates could be used in principle instead of poly(methyl methacrylate) but may be less desirable because of their lower Tg. In addition to the methacrylate or acrylate monomer, these polymers may have smaller amounts of other ethylenically unsaturated comonomers copolymerized therewith. Such additional monomers may be, for example, styrene, acrylonitrile, vinyl acetate, ethylene, butadiene and methyl vinyl ether. When copolymers are used to prepare the imicized acrylate, they preferably contain at least about 40% by weight methacrylate or acrylate units.

Representative imidized polymers include imidized poly (methyl methacrylate) or poly(methyl acrylate), imidized copolymers of either methyl methacrylate or methyl acrylate and comonomers such as those listed above, preferably wherein poly(methyl methacrylate) is reacted with methyl amine.

The molecular weight of the imidized acrylic resins employed in the PVC blends of U.S. Pat. No. 4,255,322 typically is 100,000 to 200,000 and their degree of imidization is 20 to 60%. For the present invention, the preferred molecular weight range of the imidized acrylic resins is 20,000 to 200,000, and the degree of imidization is 20 to 100%, preferably 60 to 100%, more preferably 80 to 100%.

These imidized acrylic polymers, depending on the degree of imidization of the starting polymer, may contain varying amounts of unconverted ester groups, carboxylic groups, and end-capped carboxylic groups.

As a byproduct of imidization of (meth)acrylic polymers by reaction with ammonia or primary amines, anhydride and acid groups are formed on the polymer chain. The acid and anhydride groups are reported to be intermediate in the formation of imide units. When the degree of imidization exceeds 95% and approaches 100%, the amount of acid and anhydride units present on the resultant imidized product decreases and poses less of a problem. When the degree of imidization of a polymer is 95% or less, the amount of acid and anhydride functionality normally present on the polymer chain as a natural incidence of the reaction may be objectionable. The presence of such acid and anhydride functionalities may generally adversely affect the properties of the polyimide. For example, the acid and anhydride functionality on an imidized polymer may alter the miscibility of the polymer with other thermoplastic polymers. Further, high acid and anhydride functionality can result in higher melt viscosity which would translate into the polymer being more difficult to process into various molded articles.

Methods of reducing the amount of acid and anhydride groups on the imidized acrylic polymer are known (see for example, U.S. Pat. Nos. 4,727,117, 4,954,574, 5,004,777, 5,110,877, 5,264,483, and 5,548,033 and US Patent Application Publication 2007/0055017). U.S. Pat. No. 4,727,117 discloses a process in which the residual acid and anhydride groups are treated with agents capable of converting them to non-acid or non-anhydride groups and incapable of reacting with imide units. These agents include alkylating agents and esterification agents, such as trialkyl othoformates or dimethyl carbonate. The acid level, as indicated by the weight % of the acid groups (such as methacrylic acid units) present in the polymer is from 0 to 10 weight %, preferably from 0 to 2 weight %.

Rohm & Haas Company (Philadelphia, Pa.) previously offered a range of imidized acrylic resins for various uses, including a grade designated as PARALOID® HT-510 for blending with PVC and a family of higher Tg resins designated as PARALOID® EXL-4000 for blending with other engineering resins. Depending on the degree of imidization of the starting acrylic polymer, the glass transition temperature, Tg, of the imidized acrylic resin varies and increases as the degree of imidization increases. PARALOID® HT-510 has a fairly low Tg, reported to be about 130° C. The PARALOID® EXL-4000 family has Tg values reported by the manufacturer as being in the range of 140° C. to 170° C. These resins have been blended with industrial resins such as, e.g., nylon 6, polycarbonates, acrylonitrile/styrene/butadiene and styrene/acrylonitrile resins, and poly(ethylene terephthalate) to increase their heat resistance or melt strength, to improve optical properties, or to serve as carriers for pigments and other additives.

PARALOID® EXL-4000 series resins may have from less than 1 to about 5% of carboxylic groups and some may also contain a small amount of anhydride groups. As discussed above, carboxylic groups apparently are formed during the imidization reaction and probably cannot be avoided. However, some grades of these resins have those carboxylic groups capped, presumably, by esterification.

The blends can include, in addition to the ionomer and the imidized acrylic polymer, other additives, modifiers, and ingredients as are generally used in the polymer art, including stabilizers and co-stabilizers (such as those disclosed in U.S. Pat. Nos. 3,960,984, 4,098,843, 4,766,168, 4,814,397, 5,011,890, and 5,063,263), antioxidants, pigments, colorants, UV stabilizers, toughening agents, nucleating agents, glass, minerals, lubricants, fibers, reinforcing agents, and fillers. Preferred thermal stabilizers are described in U.S. Pat. No. 5,011,890, with polyacrylamide being most preferred.

The blends are preferably prepared by tumbling or mixing together pellets, or some other similar article, of the individual components, and then intimately melt blending the mixture in a mixing device.

Regardless of the method used to make the blend, melt blending can be done by any mixing device capable of providing moderate to intensive mixing. Such mixers can develop sufficient shear at temperatures above the softening points of the individual components but below temperatures at which degradation of the polymer blend components may occur. Examples of such devices include rubber mills, internal mixers such as "Banbury" and "Brabander" mixers, single or multiblade internal mixers with a cavity heated externally or by friction, "Ko-kneaders", multibarrel mixers such as "Farrell Continuous Mixers", injection molding machines, and extruders, both single screw and twin screw, both co-rotating and counter rotating. These devices can be used alone or in combination with static mixers, mixing torpedoes and/or various devices to increase internal pressure and/or the intensity of mixing such as valves, gates, or screws designed for this purpose. It is preferred to use a mixing device that may achieve intimate mixing of the components of the blend with the greatest efficiency, consistency and evenness. Accordingly, continuous devices are preferred. Extruders are the most convenient to use because of their high throughput, possible modular construction and ease of assembly, choice of many mixing screws, and ease of control and maintenance of process temperatures. Twin screw extruders, particularly those incorporating high intensity mixing sections such as reverse pitch elements and kneading elements, are especially preferred.

Shaped articles made from blends of the present invention can be made by any of several common methods, including compression molding, injection molding, extrusion, blow molding, melt spinning, film forming including cast film or blown film techniques, and thermoforming. Injection molding is especially noted. Examples of shaped articles include sheet, profiles, rod stock, film, filaments, fibers, strapping, tape, tubing and pipe. Such shaped articles can be post treated by orientation, stretching, coating, annealing, painting, laminating and plating. Because the blends are thermoplastic, articles can be ground and remolded.

The compositions and shaped articles therefrom may be used in exterior and interior body panels for vehicles, lightweight composite panels, furniture, flooring products such as tiles or sheet flooring, protective guards, cosmetic packaging, industrial packaging film, and safety protection film. A wide variety of machine and engineering parts can be prepared by injection molding

EXAMPLES

Materials Used

ION-1: an ethylene methacrylic acid dipolymer with 12 weight % of MAA, neutralized by treatment with 2.7 weight % ZnO, melt index (MI) of 1 g/10 minutes, measured according to ASTM D1238 at 190° C. using a 2.16 kg weight.

ION-2: an ethylene methacrylic acid dipolymer with 15 weight % of MAA, neutralized by treatment with 4.3 weight % ZnO (58% neutralization), MI of 0.7 g/10 minutes, measured according to ASTM D1238 at 190° C. using a 2.16 kg weight, with 800 ppm moisture.

ION-3: an ethylene methacrylic acid dipolymer with 19 weight % of MAA, neutralized by treatment with 3.2 weight % ZnO, MI of 1.3 g/10 minutes measured according to ASTM D1238 at 190° C. using a 2.16 kg weight.

ION-4: an ethylene methacrylic acid dipolymer with 15 weight % of MAA, neutralized by treatment with 2.25 weight % Na, MI of 0.9 g/10 minutes measured according to ASTM D1238 at 190° C. using a 2.16 kg weight.

ION-5: an ethylene methacrylic acid n-butyl acrylate terpolymer with 15 weight % of MAA and 23 weight % nBA, neutralized by treatment with 2.15 weight % ZnO, MI of 0.8 g/10 minutes measured according to ASTM D1238 at 190° C. using a 2.16 kg weight.

PLEXIGLAS® V920: a PMMA acrylic resin with Melt Flow Rate of 8.0 g/10 min, measured according to ASTM D1238 at 230° C. using a 3.8 kg weight.

Nitrogen number as a weight % of nitrogen of the IA polymers was determined by a standard combustion method using a CHN analyzer, Carlo Erba Model 1108. The % (by weight) imidization of the polymer was calculated based on the nitrogen number (the nitrogen number for a 100% imidized PMMA resin is 8.4).

Weight % of methacrylic acid in the IA polymers was determined by titration and calculating the amount of methacrylic acid from the molar amount of acid neutralized. The weight % of ester groups can be calculated by subtracting the imide weight % and the acid weight % from 100. The amount of anhydride was assumed to be negligible, since anhydride could not be detected by IR.

Glass transition temperatures (Tg) of the IA polymers were determined by differential scanning calorimetry (DSC) according to ASTM D3418 (0-200° C.) with equilibration at 0° C., heating to 200° C., cooling to 0° C., and heating again to 200° C. at 10° C./min, with Tg recorded during the second heating.

Two types of IA were used in the study, both produced at laboratory scale. A 25-mm diameter single screw extruder was used to melt and meter the starting resin into the 15-meter long, 12.5-mm diameter stainless steel transfer line tube. A polymer valve at the end of the transfer line was used to regulate the pressure in the transfer line. Downstream from the polymer valve was a 25-mm twin screw extruder with two vacuum vent ports used to remove excess amine and reaction byproducts prior to pumping the polymer through a strand die and cutting the strand into pellets. The amine source was injected into the polymer melt at the start of the transfer line using dual syringe pump system. After an IA is made and the volatiles are removed in the twin-screw extruder, the IA product contains carboxylic acid groups, anhydride groups, and some unreacted esters in addition to the imide groups. "Acid reduced" versions of IA are produced by running the originally produced IA back into an extruder a second time and adding dimethyl carbonate to esterify the acid groups on the polymer chain.

IA-1 was made by reacting PLEXIGLAS® V920 with monomethylamine using a screw speed on the single screw extruder of 50 rpms that was estimated to correspond to a PMMA resin feed rate of 97 g/minute and monomethylamine injection rate of 43 ml/minute. The oil temperature set-point for the jacket around the transfer line was 280° C., polymer melt temperature readings were 260° C. The pressure at the discharge to the polymer valve was controlled to 800 to 900 psig (5.5 to 6.2 mPa). The methyl amine injection pressure was recorded as 900 to 1200 psig (6.2 to 8.3 mPa). In the twin screw extruder the vacuum at the vent ports was recorded as being 17 in Hg or 58 kPa. The melt temperature of the polymer recorded at the pelletizing die of the twin screw extruder was 245° C. By DSC and nitrogen analysis it was determined the Tg was 163° C. and the nitrogen content was 7.5 weight %. Several small batches run under the same nominal conditions were blended together to provide the imidized acrylic IA-1.

IA-2 was made by re-extruding the dried material (dried overnight at 100° C. set-point in a desiccant hopper dryer) made under the nominal conditions described above and treating with dimethyl carbonate. The single screw extruder screw speed was 74 rpm which was estimated to correspond to a feed rate for IA-1 type material of 140 g/min. The syringe pump was filled with dimethyl carbonate and injected into the transfer line at a rate of 14 ml/min to reduce the amount of acid present in the polymer. The set-point on the oil heater heating the oil jacketing the transfer line was set to 280° C. The discharge pressure at the end of the transfer line was controlled to 250 to 440 psig (1.7 to 3 mPa). The syringe pump inject pressure was 640 to 880 psig (4.4 to 6 mPA). The melt temperature of IA-1 type polymer recorded at the adapter between the single screw extruder and the transfer line was 270° C. The melt temperature of the acid reduced IA at the pelletizing die of the twin screw extruder was 235 to 265° C. By DSC and Nitrogen analysis it was determined the Tg of the acid reduced material was 151° C. and the Nitrogen content was 7.5 weight %. Several small batches were blended together to provide the acid-reduced IA-2.

The aggregate blends of the small batches of imidized acrylics were reanalyzed, with the results summarized in Table A.

TABLE A

| | Nitrogen Number | % Imide | % Acid | Tg (° C.) |
|---|---|---|---|---|
| IA-1 | 7.8 | 93 | 5.58 | 162 |
| IA-2 | 7.8 | 93 | 0.38 | 152 |

IA-1 and IA-2 were separately incorporated into the ionomers ION-1 through ION-5 by melt blending in an 18 mm Coperion twin-screw extruder. The IA concentrations prepared were 5%, 10%, and 15% by weight in each of the ionomers. The IA and the ionomer ingredients were fed at the back of the extruder using two separate feeders. The IA pellets were dried at 100° C. for five hours before the feeding. A relatively strong screw design was used to provide the desired amount of shear and mixing. Upon exiting the extruder die, the emerging strand was quenched in a water bath and then cut into pellets of 3 mm length with a conventional strand cutter. The pellets were then dried at 80° C. overnight, followed by injection molding to form test bars on a 1.5-ounce Arburg injection molding machine.

During processing, blending either IA with ionomers was accomplished without any difficulties. The IA dispersed well in the ionomer matrix with average particle size in the submicron range. Incorporating IA into ionomers did not increase the melt viscosity; it actually reduced the die pressure in the extruder. This indicates that adding IA may even improve the extrusion and injection molding processability.

Mechanical and thermal tests were performed using ASTM test methods. Flexural modulus was determined according to ASTM D-790. Notched Izod impact strength was determined according to ASTM D-256. The Vicat temperature was determined according to ASTM D1525, with temperature increase rate of 2.0° C./minute, 10 Newton force and penetration of 1 mm. Heat deflection temperature (HDT) was determined in each case at 66 psi (0.45 MPa) according to ASTM D-648. Dynamic Mechanical Analyses (DMA) were conducted to assess modulus increase at elevated temperature, and upper use temperature increase at a constant stiffness.

The results of Vicat temperature testing of ionomers blended with IA-1 and IA-2 compared to controls of neat ionomers are summarized in Tables 1 and 2. For all five ionomers in this study the acid-reduced IA modifier IA-2 was very effective at increasing Vicat temperature over the control (Table 1). At a loading of 15 weight % of IA-2, Vicat temperature increased significantly, with Vicat temperature of about 3 to about 12° C., or 5 to 20% or higher, such as improvement up to about 18%. The non-acid-reduced IA-1 was not as effective at increasing Vicat temperature (Table 2), with increase of Vicat temperature of 1.5 to 10° C., or about 3 to about 15%.

TABLE 1

| Vicat Temperature (° C.) with IA-2 (acid-reduced) | | | | | |
|---|---|---|---|---|---|
| Ionomer in blend | ION-1 | ION-2 | ION-3 | ION-4 | ION-5 |
| Weight % IA-2 | | Vicat Temperature (° C.) | | | |
| 0 (Control) | 71.5 | 61.0 | 56.0 | 59.8 | 46.0 |
| 5 | 72.1 | 63.9 | 61.0 | 63.6 | 47.3 |
| 10 | 74.5 | 66.6 | 63.6 | 66.7 | 48.1 |

TABLE 1-continued

Vicat Temperature (° C.) with IA-2 (acid-reduced)

| Ionomer in blend Weight % IA-2 | ION-1 | ION-2 | ION-3 | ION-4 | ION-5 |
|---|---|---|---|---|---|
| | | Vicat Temperature (° C.) | | | |
| 15 | 76.3 | 68.8 | 66.0 | 70.4 | 49.5 |
| Increase at 15% IA (° C.) | 4.8 | 7.8 | 9.9 | 10.5 | 3.5 |
| Increase at 15% IA (%) | 6.7 | 12.8 | 17.7 | 17.6 | 7.5 |

TABLE 2

Vicat Temperature (° C.) with IA-1 (non-acid-reduced)

| Ionomer in blend Weight % IA-1 | ION-1 | ION-2 | ION-3 | ION-4 | ION-5 |
|---|---|---|---|---|---|
| | | Vicat Temperature (° C.) | | | |
| 0 (Control) | 71.5 | 61.0 | 56.0 | 59.8 | 46.0 |
| 5 | 71.5 | 63.1 | 58.9 | 61.4 | 47.3 |
| 10 | 72.7 | 64.8 | 60.6 | 64.2 | 47.8 |
| 15 | 73.5 | 65.8 | 61.8 | 67.3 | 47.8 |
| Increase at 15% IA (° C.) | 2.0 | 4.8 | 5.7 | 7.5 | 1.8 |
| Increase at 15% IA (%) | 2.8 | 7.9 | 10.2 | 12.5 | 3.9 |

The results of heat deflection temperature testing are shown in Tables 3 and 4. For blends with acid-reduced IA-2, heat deflection temperature increased 5 to 10° C. at 15 weight % loading. For the soft terpolymer ION-5, the heat deflection temperature increased from essentially unmeasurable to over 45° C. The acid-reduced IA-2 was more effective at increasing the heat deflection temperature than the non-acid-reduced IA-1.

TABLE 3

Heat Deflection Temperature (° C.) with IA-2 (acid-reduced)

| Ionomer in blend Weight % IA-2 | ION-1 | ION-2 | ION-3 | ION-4 | ION-5 |
|---|---|---|---|---|---|
| | | Heat Deflection Temperature (° C.) | | | |
| 0 (Control) | 39.9 | 41.6 | 39.6 | 41.3 | Less than 27 |
| 5 | 41.9 | 41.8 | 40.3 | 43.1 | 37.9 |
| 10 | 44.2 | 45 | 42.5 | 44.4 | 43.4 |
| 15 | 48.6 | 47.5 | 45.6 | 48 | 46.1 |

TABLE 4

Heat Deflection Temperature (° C.) with IA-1 (non-acid-reduced)

| Ionomer in blend Weight % IA-1 | ION-1 | ION-2 | ION-3 | ION-4 | ION-5 |
|---|---|---|---|---|---|
| | | Heat Deflection Temperature (° C.) | | | |
| 0 (Control) | 39.9 | 41.6 | 39.6 | 41.3 | Less than 27 |
| 5 | 40.9 | 42.7 | 42.7 | 42.8 | 40.7 |
| 10 | 42.2 | 41.2 | 41.2 | 42.6 | 35.9 |
| 15 | 43.2 | 42.5 | 42.5 | 43.4 | 34.9 |

Addition of IA-2 to the ionomers also significantly increased the upper (use) temperature limit for a given stiffness requirement. The upper temperature limits for various ionomer/IA-2 blends under the condition that the modulus of the ionomer/IA blends was maintained at 40 MPa level are summarized in Table 5.

TABLE 5

Upper Temperature Limit (° C.) with IA-2

| Ionomer in blend Weight % IA-2 | ION-1 | ION-2 | ION-3 | ION-4 | ION-5 |
|---|---|---|---|---|---|
| | | Upper Temperature Limit (° C.) | | | |
| 0 (Control) | 59.5 | 56.1 | 58.0 | 63.0 | 23.2 |
| 5 | 79.0 | 74.1 | 71.2 | 77.0 | 47.9 |
| 10 | 90.3 | 85.0 | 81.0 | 85.4 | 57.9 |
| 15 | 93.5 | 85.0 | 85.6 | 85.4 | 60.8 |
| Increase at 15% IA (° C.) | 34.0 | 28.9 | 27.6 | 22.4 | 37.6 |

Table 6 shows the upper limit temperature behavior for blends of ION-2 with IA-2 when maintaining the compound storage modulus at 21 MPa.

TABLE 6

| Weight % of IA-2 in blend | Upper Temperature Limit (° C.) | UTL increase (° C.) |
|---|---|---|
| 0 (Control) | 68.0 | — |
| 5 | 87.5 | 19.5 |
| 10 | 93.0 | 25.0 |

Room temperature flexural modulus results are summarized in Table 7. For the ionomers prepared from dipolymers (ION-1 through ION-4) the flexural modulus increased up to 86% at 15 weight % IA-2 loading. For the softer terpolymer ionomer ION-5, the increase in flexural modulus was even more dramatic, with a seven-fold increase. Tensile strength also improved, up around 30% with 15 weight % of IA-2 (Table 8).

TABLE 7

Flexural Modulus at 23° C. (MPa) with IA-2

| Ionomer in blend Weight % IA-2 | ION-1 | ION-2 | ION-3 | ION-4 | ION-5 |
|---|---|---|---|---|---|
| | | Flexural Modulus at 23° C. (MPa) | | | |
| 0 (Control) | 419 | 536 | 648 | 531 | 48 |
| 15 | 781 | 928 | 996 | 893 | 344 |
| Increase at 15% IA (° C.) | 86 | 73 | 54 | 68 | 768 |

TABLE 8

Tensile Strength at 23° C. (MPa) with IA-2

| Ionomer in blend Weight % IA-2 | ION-1 | ION-2 | ION-3 | ION-4 | ION-5 |
|---|---|---|---|---|---|
| | | Tensile Strength at 23° C. (MPa) | | | |
| 0 (Control) | 19.8 | 20.4 | 22.7 | 19.1 | 10.1 |
| 15 | 21.3 | 23.8 | 26.3 | 24.0 | 10.8 |
| Increase at 15% IA (° C.) | 8 | 17 | 16 | 26 | 7 |

Room temperature impact strength results are summarized in the Table 9.

TABLE 9

Impact Strength at 23° C. (ft-lb/in) with IA-2

| Ionomer in blend Weight % IA-2 | ION-1 | ION-2 | ION-3 | ION-4 | ION-5 |
|---|---|---|---|---|---|
| | | Impact Strength at 23° C. (ft-lb/in) | | | |
| 0 (Control) | 15.8 | 6.23 | 19.1 | 10.2 | 3.6 |
| 5 | 16.5 | 5.53 | 19.4 | 10.1 | 3.8 |
| 10 | 18.5 | 6.07 | 20.3 | 11.9 | 5.97 |
| 15 | 18.6 | 5.57 | 16.5 | 13.7 | 7.08 |

The addition of 15weight % of IA-2 to ION-1, ION-4 and ION-5 has increased the room temperature impact strength. For ION-2 and ION-3, the addition of 15 weight % of IA-2 caused just a slight decrease in room temperature impact strength.

The Dynamic Mechanical Analyses (DMA) results showed significant increases in storage modulus (stiffness) for all five ionomers (See Table 10). Storage modulus represents the elastic component of the modulus of the material as opposed to the viscous component. In Table 10, the relative storage modulus is represented by the rows labeled "Ratio," which indicates the storage modulus of the example (15 weight % of IA-2) divided by the storage modulus of the control (0 weight % of IA-2) for each of the ionomer compositions.

TABLE 10

| | Temperature (° C.) | | | | | |
|---|---|---|---|---|---|---|
| | 25 | 40 | 50 | 60 | 70 | 80 |
| ION-1 (100%) | 442.8 | 257.0 | 134.5 | 38.6 | 25.2 | 19.1 |
| 85% ION-1/15% IA-2 | 729.7 | 522.2 | 342.4 | 155.3 | 110.5 | 83.5 |
| Ratio | 1.65 | 2.03 | 2.55 | 4.02 | 4.38 | 4.37 |
| ION-2 (100%) | 450.0 | 287.2 | 92.5 | 31.8 | 19.4 | 11.7 |
| 85% ION-2/15% IA-2 | 672.0 | 482.6 | 231.1 | 129.5 | 88.0 | 54.6 |
| Ratio | 1.49 | 1.68 | 2.50 | 4.07 | 4.54 | 4.68 |
| ION-3 (100%) | 624.1 | 437.0 | 231.7 | 32.7 | 18.9 | 11.3 |
| 85% ION-3/15% IA-2 | 900.0 | 684.7 | 415.0 | 127.0 | 85.8 | 55.2 |
| Ratio | 1.44 | 1.57 | 1.79 | 3.88 | 4.54 | 4.88 |
| ION-4 (100%) | 377.0 | 255.9 | 97.5 | 47.2 | 25.4 | 13.4 |
| 85% ION-4/15% IA-2 | 595.0 | 447.5 | 261.4 | 156.9 | 100.1 | 57.0 |
| Ratio | 1.58 | 1.75 | 2.68 | 3.32 | 3.94 | 4.24 |
| ION-5 (100%) | 37.0 | 18.9 | 11.1 | 7.7 | 5.6 | 3.8 |
| 85% ION-5/15% IA-2 | 174.0 | 116.1 | 65.6 | 41.4 | 25.4 | 14.3 |
| Ratio | 4.70 | 6.14 | 5.91 | 5.38 | 4.54 | 3.76 |

For the dipolymer-based ionomers (ION-1 through ION-4) with 15% IA-2 loading, the modulus increased around 55% at room temperature from those of the controls, the magnitude of the improvement increasing when tested at a higher temperature. At 80° C. the modulus increase was around 350%. For the terpolymer based ionomer ION-5, the increase in modulus at 25° C. was much higher and appeared to peak at temperatures between 40 and 50° C.

The invention claimed is:

1. A composition comprising, or produced by mixing, a mixture of, based on the weight of the mixture, 70 to 99 weight % of an ionomer composition and 1 to 30 weight % of an imidized acrylic resin wherein
the ionomer composition is produced from at least one ethylene acid copolymer by a process comprising neutralizing at least a portion of the acid moieties in the acid copolymer with a salt containing alkali metal cations, alkaline earth metal cations, transition metal cations, or combinations of two or more thereof;
the ethylene acid copolymer comprises copolymerized comonomers of ethylene, about 3 to about 30 weight % of copolymerized comonomers of at least one $C_3$ to $C_8$ α,β ethylenically unsaturated carboxylic acid, and 0 to about 30 weight % of copolymerized comomers of at least one $C_3$ to $C_8$ α,β ethylenically unsaturated carboxylic acid ester, based on the total weight of the ethylene acid copolymer, and the reminder is ethylene; and
the imidized acrylic resin has a degree of imidization from 20% to 100%.

2. The composition of claim 1 wherein the imidized acrylic resin is obtained by treating an acrylic polymer with ammonia or a monoalkyl amine; the monoalkyl group has from one to five carbon atoms; and the acid level is from 0 to 10 weight % of the imidized acrylic resin.

3. The composition of claim 1 wherein the imidized acrylic resin is obtained by treating polymethyl methacrylate with methyl amine and the degree of imidization of the imidized acrylic resin is 60% to 100%.

4. The composition of claim 1, 2, or 3 wherein the imidized acrylic resin comprises cyclic imide units.

5. The composition of claim 3 wherein the degree of imidization of the imidized acrylic resin is 80% to 100%.

6. The composition of claim 5 wherein the acid level of the imidized acrylic resin is from 0 to 2 weight %.

7. The composition of claim 2 wherein the ethylene acid copolymer is a dipolymer consisting essentially of copolymerized comonomers of ethylene and from about 5 to about 30 weight % of copolymerized comonomer of a $C_3$ to $C_8$ α,β-ethylenically unsaturated carboxylic acid.

8. The composition of claim 7 wherein the copolymerized comonomer of the $C_3$ to $C_8$ α,β-ethylenically unsaturated carboxylic acid is acrylic acid or methacrylic acid and is present in the dipolymer from 10 to 20 weight %.

9. The composition of claim 8 wherein the degree of imidization of the imidized acrylic resin is 80% to 100%.

10. The composition of claim 2 wherein the ethylene acid copolymer is a terpolymer consisting essentially of copolymerized comonomers of ethylene, from about 3 to about 30 weight % of copolymerized comonomers of a $C_3$ to $C_8$ α,β-ethylenically unsaturated carboxylic acid, and from about 3 to about 30 weight % of copolymerized comonomers of a $C_3$ to $C_8$ α,β ethylenically unsaturated carboxylic acid ester.

11. The composition of claim 10 wherein the copolymerized comonomer of the $C_3$ to $C_8$ α,β-ethylenically unsaturated carboxylic acid is acrylic acid or methacrylic acid and is present in the dipolymer from 10 to 20 weight %; and the copolymerized comonomers of a $C_3$ to $C_8$ α,β ethylenically unsaturated carboxylic acid ester is alkyl acrylate or alkyl methacrylate and is present in the terpolymer from 10 to 30 weight %.

12. The composition of claim 11 wherein the degree of imidization of the imidized acrylic resin is 80% to 100%.

13. The composition of claim 12 wherein the alkyl acrylate is butyl acrylate.

14. An article comprising or produced from the composition of claim 1.

15. A method comprising (1) melt blending a ionomer composition and an imidized acrylic resin to produce a molten composition; (2) forming the molten composition into a desired shape; and (3) cooling the molten composition to provide a shaped article wherein
the molten composition comprises, based on the weight of the molten composition, 70 to 99 weight % of the ionomer composition and 1 to 30 weight % of the imidized acrylic resin;
the ionomer composition is produced from at least one ethylene acid copolymer by a process comprising neutralizing at least a portion of the acid moieties in the acid copolymer with a salt containing alkali metal cations, alkaline earth metal cations, transition metal cations, or combinations of two or more thereof;
the ethylene acid copolymer comprises copolymerized comonomers of ethylene, about 3 to about 30 weight % of copolymerized comonomers of at least one $C_3$ to $C_8$ α,β-ethylenically unsaturated carboxylic acid, and 0 to about 30 weight % of copolymerized comonomers of at least one $C_3$ to $C_8$ α,β ethylenically unsaturated carboxylic acid ester, based on the total weight of the ethylene acid copolymer, and the remainder is ethylene;

the imidized acrylic resin has a degree of imidization from 20% to 100%;

the shaped article has a Vicat temperature, determined according to ASTM D1525, that exceeds that of a comparison standard article; and the shaped article and the comparison standard article have the same shape and structure with the exception that the comparison standard article is produced from the ionomer composition that does not comprise the imidized acrylic resin.

16. The method of claim 15 further comprising reacting polymethyl methacrylate with methyl amine to produce the imidized acrylic resin.

17. The method of claim 15 wherein the ethylene acid copolymer is a dipolymer consisting essentially of copolymerized comonomers of ethylene and from about 5 to about 30 weight % of copolymerized comonomer of a $C_3$ to $C_8$ α,β-ethylenically unsaturated carboxylic acid.

18. The method of claim 17 wherein the copolymerized comonomer of the $C_3$ to $C_8$ α,β-ethylenically unsaturated carboxylic acid is acrylic acid or methacrylic acid and is present in the dipolymer from 10 to 20 weight %.

19. The method of claim 15 wherein the ethylene acid copolymer is a terpolymer consisting essentially of copolymerized comonomers of ethylene, from about 3 to about 30 weight % of copolymerized comonomers of a $C_3$ to $C_8$ α,β-ethylenically unsaturated carboxylic acid, and from about 3 to about 30 weight % of copolymerized comonomers of a $C_3$ to $C_8$ α,β ethylenically unsaturated carboxylic acid ester.

20. The method of claim 19 wherein the copolymerized comonomer of the $C_3$ to $C_8$ α,β-ethylenically unsaturated carboxylic acid is acrylic acid or methacrylic acid and is present in the dipolymer from 10 to 20 weight %; and the copolymerized comonomers of a $C_3$ to $C_8$ α,β ethylenically unsaturated carboxylic acid ester is alkyl acrylate or alkyl methacrylate and is present in the terpolymer from 10 to 30 weight %.

* * * * *